(12) United States Patent
Schukai et al.

(10) Patent No.: US 10,469,263 B2
(45) Date of Patent: Nov. 5, 2019

(54) SYSTEMS AND METHODS FOR PROVIDING IDENTITY SCORES

(71) Applicants: Robert Joseph Schukai, Marietta, GA (US); Scott Ryan Manuel, Durham, NC (US)

(72) Inventors: Robert Joseph Schukai, Marietta, GA (US); Scott Ryan Manuel, Durham, NC (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 132 days.

(21) Appl. No.: 15/432,407

(22) Filed: Feb. 14, 2017

(65) Prior Publication Data
US 2017/0353311 A1    Dec. 7, 2017

Related U.S. Application Data

(60) Provisional application No. 62/345,968, filed on Jun. 6, 2016.

(51) Int. Cl.
*H04L 9/32*  (2006.01)
*H04L 9/06*  (2006.01)

(52) U.S. Cl.
CPC .......... *H04L 9/3231* (2013.01); *H04L 9/0618* (2013.01); *H04L 9/3234* (2013.01);
(Continued)

(58) Field of Classification Search
None
See application file for complete search history.

(56) References Cited

U.S. PATENT DOCUMENTS

| 7,953,724 | B2* | 5/2011 | Griffith | G06F 16/355 |
| | | | | 707/708 |
| 8,621,642 | B2* | 12/2013 | Bjorn | G06F 21/41 |
| | | | | 709/225 |

(Continued)

FOREIGN PATENT DOCUMENTS

WO    2017066002    † 4/2017

OTHER PUBLICATIONS

Guy Zyskind et al., "Decentralizing Privacy: Using Blockchain to Protect Personal Data", 2015 IEEE Security and Privacy Workshops, 978-1-4799-9933-0, Jul. 2015.*

(Continued)

*Primary Examiner* — Piotr Poltorak
(74) *Attorney, Agent, or Firm* — Norton Rose Fulbright US LLP (57) ABSTRACT

An embodiment of a method of providing identity services includes receiving identity data from an identity user, the identity data related to an identity of the identity user; receiving validation data from an identity provider, the validation data related to the identity data; if the validation data indicates that the identity data is valid, generating a transaction to store data related to the identity of the identity user on a blockchain of a blockchain system, the data to be stored including a representation of at least one of: the identity data, or the validation data; and transmitting the transaction to at least one distributed node of the blockchain system. An embodiment of a method of providing an identity score includes receiving an identity score request for an identity user from an identity score requestor; executing a read to at least one distributed node of a blockchain system to retrieve data related to one or more identities of the identity user stored on a blockchain of the blockchain system; for each of the one or more identities, determining (Continued)

a weight; and determining the identity score as a function of the weights for each of identities.

31 Claims, 6 Drawing Sheets

(52) U.S. Cl.
CPC ........ *H04L 9/3239* (2013.01); *H04L 2209/38* (2013.01); *H04L 2209/56* (2013.01)

(56) References Cited

U.S. PATENT DOCUMENTS

| | | | | |
|---|---|---|---|---|
| 9,027,105 | B1* | 5/2015 | Saylor | H04W 4/80 |
| | | | | 726/7 |
| 9,355,155 | B1* | 5/2016 | Cassel | G06F 21/552 |
| 9,635,000 | B1* | 4/2017 | Muftic | H04L 63/0435 |
| 9,703,986 | B1* | 7/2017 | Ashley | G06F 21/6263 |
| 9,876,646 | B2* | 1/2018 | Ebrahimi | H04L 9/3236 |
| 10,102,526 | B1* | 10/2018 | Madisetti | G06Q 20/38215 |
| 10,129,269 | B1* | 11/2018 | Ford | H04L 63/14 |
| 10,135,834 | B1* | 11/2018 | Galebach | H04L 63/102 |
| 10,255,419 | B1* | 4/2019 | Kragh | H04L 63/0861 |
| 2002/0056043 | A1* | 5/2002 | Glass | G06F 21/32 |
| | | | | 713/179 |
| 2005/0201363 | A1* | 9/2005 | Gilchrist | H04L 51/12 |
| | | | | 370/352 |
| 2008/0281606 | A1* | 11/2008 | Kitts | G06Q 30/02 |
| | | | | 705/1.1 |
| 2009/0147990 | A1 | 6/2009 | Lev | |
| 2010/0131369 | A1* | 5/2010 | Dominguez | G06Q 30/02 |
| | | | | 705/14.67 |
| 2010/0305989 | A1* | 12/2010 | Mu | G06Q 10/0635 |
| | | | | 705/7.28 |
| 2012/0054095 | A1 | 3/2012 | Lesandro et al. | |
| 2012/0192261 | A1* | 7/2012 | Blot-Levevre | G06Q 20/02 |
| | | | | 726/10 |
| 2012/0290482 | A1 | 11/2012 | Atef et al. | |
| 2013/0117832 | A1* | 5/2013 | Gandhi | H04L 9/3271 |
| | | | | 726/7 |
| 2013/0218797 | A1* | 8/2013 | Prichard | G06Q 50/265 |
| | | | | 705/325 |
| 2014/0279641 | A1* | 9/2014 | Singh | G06Q 50/265 |
| | | | | 705/325 |
| 2014/0282977 | A1 | 9/2014 | Madhu et al. | |
| 2015/0058950 | A1 | 2/2015 | Miu | |
| 2015/0356523 | A1 | 12/2015 | Madden | |
| 2015/0363777 | A1 | 12/2015 | Ronca et al. | |
| 2016/0203575 | A1* | 7/2016 | Madhu | G06O 50/265 |
| | | | | 705/319 |
| 2016/0267474 | A1* | 9/2016 | Lingham | G06Q 20/363 |
| 2016/0328713 | A1* | 11/2016 | Ebrahimi | H04L 9/3066 |
| 2017/0046651 | A1* | 2/2017 | Lin | G06Q 20/0655 |
| 2017/0195336 | A1* | 7/2017 | Ouellette | H04L 63/0861 |
| 2017/0236121 | A1* | 8/2017 | Lyons | G06F 17/3033 |
| | | | | 705/71 |
| 2017/0243209 | A1* | 8/2017 | Johnsrud | G06Q 20/40 |
| 2017/0250972 | A1* | 8/2017 | Ronda | H04L 9/08 |
| 2017/0324750 | A1* | 11/2017 | Khan | H04L 63/123 |
| 2018/0063099 | A1* | 3/2018 | Versteeg | H04L 9/3239 |
| 2018/0176017 | A1* | 6/2018 | Rodriguez | H04L 63/08 |
| 2018/0374097 | A1* | 12/2018 | Hanna | H04L 9/0891 |

OTHER PUBLICATIONS

International Search Report and Written Opinion dated May 11, 2017, of the corresponding International Application PCT/US2017/017840 filed Feb. 14, 2017, 9 pages.
EP Communication with Supplementary Partial European Search Report dated Apr. 26, 2019, of the corresponding EP Application No. 17810654.8 filed Jul. 27, 2018, 11 pages.
EP Communication with Extended European Search Report dated Aug. 23, 2019, of the corresponding EP Application No. 17810654.8 filed Jul. 27, 2018, 12 pages.

\* cited by examiner
† cited by third party

SYSTEMS AND METHODS FOR PROVIDING IDENTITY SCORES

CROSS REFERENCE TO RELATED APPLICATIONS

This application claims priority to U.S. Provisional Patent Application No. 62/345,968, filed on Jun. 6, 2016, which is hereby incorporated by reference in its entirety.

BACKGROUND INFORMATION

Currently a myriad of identities and identity systems exist to perform identifications within a variety of different contexts. Traditional paper or physical identities include state issued licenses, passports, etc., which authorities visually inspect, e.g., at government offices, traffic stops, and border crossings, to provide services, authorizations, etc. Commercial identities include bank cards, credit cards, membership cards, etc., which point of sale machines magnetically scan to enable transactions. Digital identities include accounts, user names and passwords for Facebook, Twitter, etc., which a server requests to enable access to content of the accounts. Biometric identities include fingerprints, facial characteristics, iris patterns, DNA sequences, etc., which are optically scanned, chemically tested, etc. to enable access to systems and services.

However, the fractured nature of existing identities and identity systems has created problems for the use of identity in some contexts. The large number of identities and identity systems creates inefficiency in their implementation and use, as both identity users and entities performing identifications must have or support a variety of such identities and systems. Each of these identities is also typically targeted for only a relatively narrow purpose, and may not provide much usefulness beyond performing a basic identification of an individual. Finally, many of these identities and identity systems, whether traditional or of a more recent digital nature, are still susceptible to forgery, attack, or other fraudulent use, even in view of protective measures.

Thus, a need exits for systems and methods to provide identity in a variety of different contexts, with a greater functionality, security and reliability.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

DETAILED DESCRIPTION OF EXAMPLE EMBODIMENTS

Embodiments of an identity score system provide improved identity services to both identity users and entities performing identifications.

Embodiments of the identity score system may enable an identity user, such as an individual or other entity, to maintain a profile of validated identity data on a blockchain of a blockchain system. Such an identity profile provides an immutable, secure identity data store for the identity user, from which identity services may be reliably provided.

In an exemplary embodiment, to create and maintain the user profile, the identity score system receives identity data from an identity user related to one or more identities of the identity user, such as government-issued identities, commercial identities, social media accounts, biometric traits, etc. The identity score system also receives validation data from an identity provider that issued the identity, indicating whether the received identity data is valid. If the validation data indicates that the identity data is valid, the identity system generates a transaction to the blockchain system to store data based on the validated identity on the blockchain, such as a cryptographic encoding of the identity or validation data. The identity score system then transmits the transaction to at least one distributed node of the blockchain system, initiating a block creation process by which the blockchain system incorporates the transaction, and stores the data, on the blockchain.

Embodiments of the identity score system also enable the provision of identity scores or score data based on the validated identities represented on the blockchain to entities performing identification of the identity user. The identity score may be configured to accommodate different identification contexts, such as, e.g., to provide an improved indication that the identity user is who is the identity user claims to be, to provide an improved indication of whether the identity user is suited to engage in a particular commercial transaction, to enable improved operation of a security device or system, etc. As the identity score is based on the data stored on the blockchain for the validated identity, it also provides a more reliable, immutable and secure identification.

In an exemplary embodiment, to provide a score service, the identity score system receives an identity score request from a score requestor, such as a government, commercial or other system, for an identity user on whom the score requestor is performing an identification. In response, the identity system executes a read to at least one distributed node of the blockchain system to retrieve data representing the validated identities of the identity user stored on the blockchain. Function data defining the calculation of the identity score is then determined, such as, e.g., weights indicating the relative importance of each identity to the score. The identity score is then calculated according to the retrieved validated identities and determined function data, such as by summing factors based on the weights. The score service may be flexibly configured, so that the function data and/or identity score may be determined either by the identity score system in response to the identity score request, providing a fast and easy identity score service to the identity score requestor, or by the identity score requestor based on the retrieved data, providing flexibility in defining the composition of the identity score according to a particular identification process.

Embodiments of the identity score system also may maintain the determined function data and/or identity scores on the blockchain, enabling provision of a fast and easy score service to the score requestor, and also creating an immutable and reliable history of this data over time, which may be used to rectify instances of identity theft or other fraudulent or malicious activity.

Figure 1:
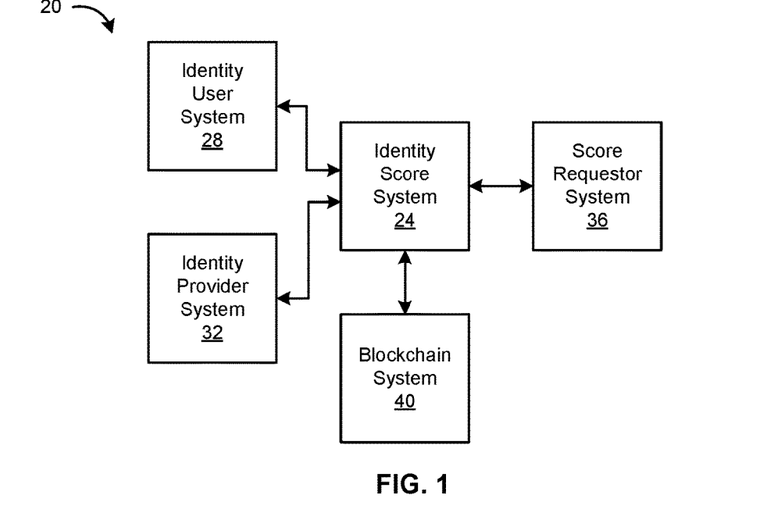
FIG. 1 is a schematic diagram depicting an embodiment of a system for providing identity services.

FIG. 1 depicts an exemplary embodiment of a system for providing identity services 20, including an identity score system 24, an identity user system 28, an identity provider system 32, a score requestor system 36 and a blockchain system 40. The identity score system 24 provides identity scoring services for identity users and score requestors. The identity score system 24 receives identity and identity validation data from identity users and identity providers, and stores representations of the received data on a blockchain of the blockchain system 40. The identity score system 24 also receives identity score requests from score requestors, and retrieves data from the blockchain to respond to the requests. The identity user, identity provider and score requestor systems 28, 32, 36 communicate identity, validation and score request data with the identity score system 24. The blockchain system 40 provides a distributed transaction ledger, in the form of a blockchain, to store the identity, validation and/or score request data.

Figure 2:
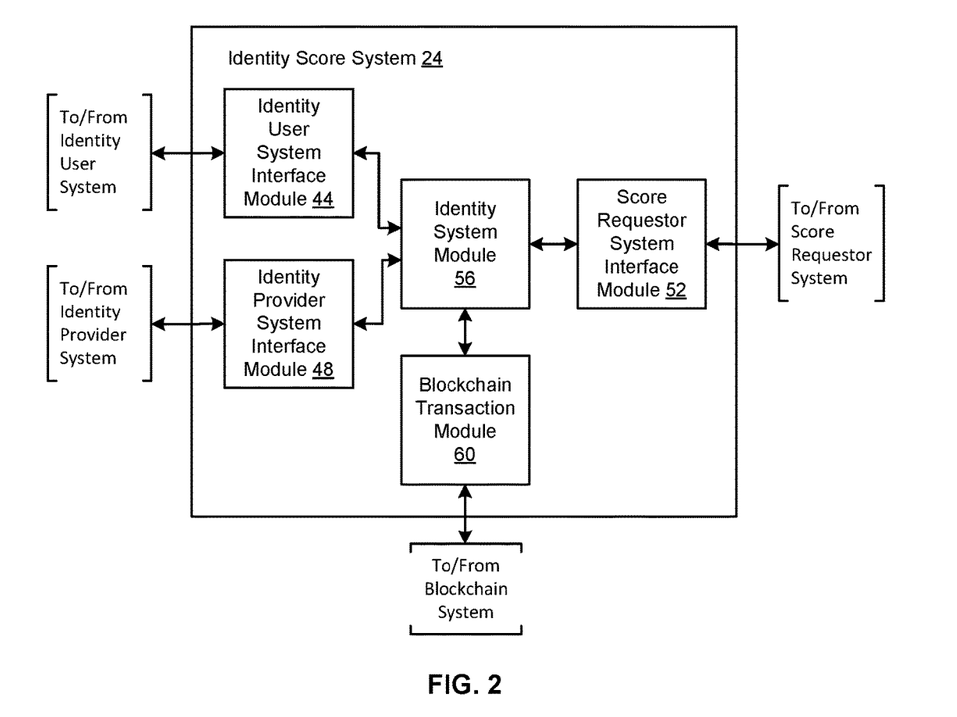
FIG. 2 is a schematic diagram depicting an embodiment of an identity score system.

FIG. 2 depicts an exemplary embodiment of the identity score system 24, including an identity user system interface module 44, an identity provider system interface module 48, a score requestor system interface module 52, an identity system module 56, and a blockchain transaction module 60. The identity user system interface, identity provider interface and score requestor interface modules 44, 48, 52 provide interfaces for the identity user, identity provider and score requestor systems 28, 32, 36 to communicate the identity, validation and score request data. The identity system module 56 receives, processes and routes the identity, validation and score request data responsive to identity, validation and score functionality discussed herein. The blockchain transaction module 60 generates transactions and read calls to the blockchain system 40 to store and retrieve identity, validation, function and/or identity score data to and from the blockchain system 40.

In embodiments, the identity score system 24 may include only any subset of, or an alternative connection of, the features depicted in or discussed herein in regard to FIG. 2.

Figure 3:
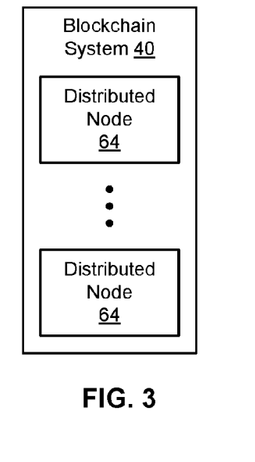
FIG. 3 is a schematic diagram depicting an embodiment of a blockchain system.

FIG. 3 depicts an exemplary embodiment of the blockchain system 40 including a plurality of distributed nodes 64. The distributed nodes 64 are organized as a peer-to-peer network, in which each of the nodes 64 may connect to one or more of the other nodes 64 using a peer-to-peer communication protocol. At least one or some of the distributed nodes 64 also connect to the identity score system 24.

Figure 4:
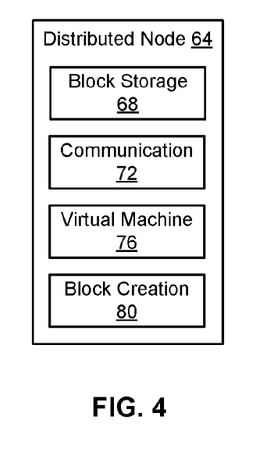
FIG. 4 is a schematic diagram depicting an embodiment of a distributed node of the blockchain system.

FIG. 4 depicts an exemplary embodiment of the distributed node 64 of the blockchain system 40, including a block storage module 68, a communication module 72, a virtual machine module 76 and a block creation module 80. The block storage module 68 stores blocks of the blockchain of the blockchain system 40. The communication module 72 performs communications between the distributed node 64 and other distributed nodes 64 and the identity score system 24. The virtual machine module 76 executes contracts stored on the blockchain of the blockchain system 40. The block creation module 80 performs an algorithm to incorporate transactions into blocks of the blockchain of the blockchain system 40, also referred to as mining blocks of the blockchain.

In embodiments, one or more of the distributed nodes 64 of the blockchain system 40 include only selected subsets of the components depicted in FIG. 4, so as to perform only corresponding subsets of the functions performed by the included modules.

Figure 5:
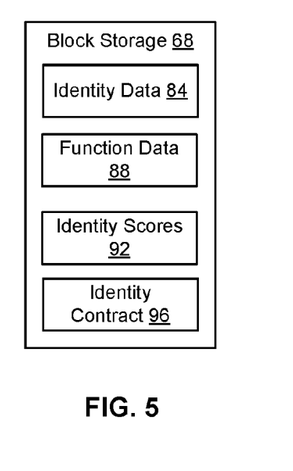
FIG. 5 is a schematic diagram depicting an embodiment of a block storage module of the blockchain system.

FIG. 5 depicts an exemplary embodiment of the block storage module 68, including an identity data component 84, a function data component 88, an identity score component 92, and an identity contract component 96. The blockchain storage module 68 stores blocks of the blockchain, which includes an ordered sequence of data blocks, each including a header, a list of transactions incorporated into the block, and optionally one or more of account data or data variables. The identity data component 84 includes the validated identity data stored in the blocks of the blockchain. The function data component 88 includes the function data, defining identity score calculations, stored in the blocks of the blockchain. The identity score component 92 includes the calculated identity scores stored in the blocks of the blockchain. The identity contract component 96 includes an identity contract, for providing identity services in embodiments of the blockchain system 40 supporting smart contracts, stored in the blocks of the blockchain.

In embodiments, the block storage module 68 may include only selected subsets of the components depicted in FIG. 5, so as to store only corresponding subsets of the data stored by the included components, such as in embodiments of the system utilizing only such subsets of the data.

Components of the identity score system 24, identity user system 28, identity provider system 32, score requestor system 36 and blockchain system 40 may be implemented as hardware, software, or a mixture of hardware and software. For example, each of the identity score system 24, identity user system 28, identity provider system 32, score requestor system 36, nodes 64 of the blockchain system 40, and/or any individual one, subset, or all of the components thereof, may be implemented using a processor and a non-transitory storage medium, where the non-transitory machine-readable storage medium includes program instructions that when executed by the processor perform embodiments of the functions of such components discussed herein.

In embodiments, the identity score system 24 may be a computer system, such as, e.g., an Internet server, cloud server, etc., owned or operated by an identity score service provider; the identity user system 28 may be a computer system, such as, e.g., a desktop computer, laptop computer, mobile computing device, etc. owned or operated the identity user; the identity provider system 32 may be a computer system, such as, e.g., a server, a desktop computer, laptop computer, mobile computing device, etc., owned or operated by an identity provider; the score requestor system 36 may be a computer, point of sale and/or security system, such as, e.g., a server, a desktop computer, a laptop computer, a mobile computing device, a point of sale transaction terminal, a security authorization device, etc., owned or operated by a score requestor; the distributed nodes 64 of the blockchain system 40 each may be a computing system, such as, e.g., a desktop computer, laptop computer, mobile computing device, network device, server, cloud server, etc., owned or operated by the identity score service provider or another entity or entities.

The identity score system 24 provides identity services in a variety of different contexts, with greater functionality, security and reliability. Embodiments of the identity score system 24 enable an identity user to maintain a profile of data representing validated identities on a blockchain. The identity profile provides an immutable, secure identity data store for the identity user, from which identity services, such as the provision of identity scores, may be reliably provided.

Figure 6:
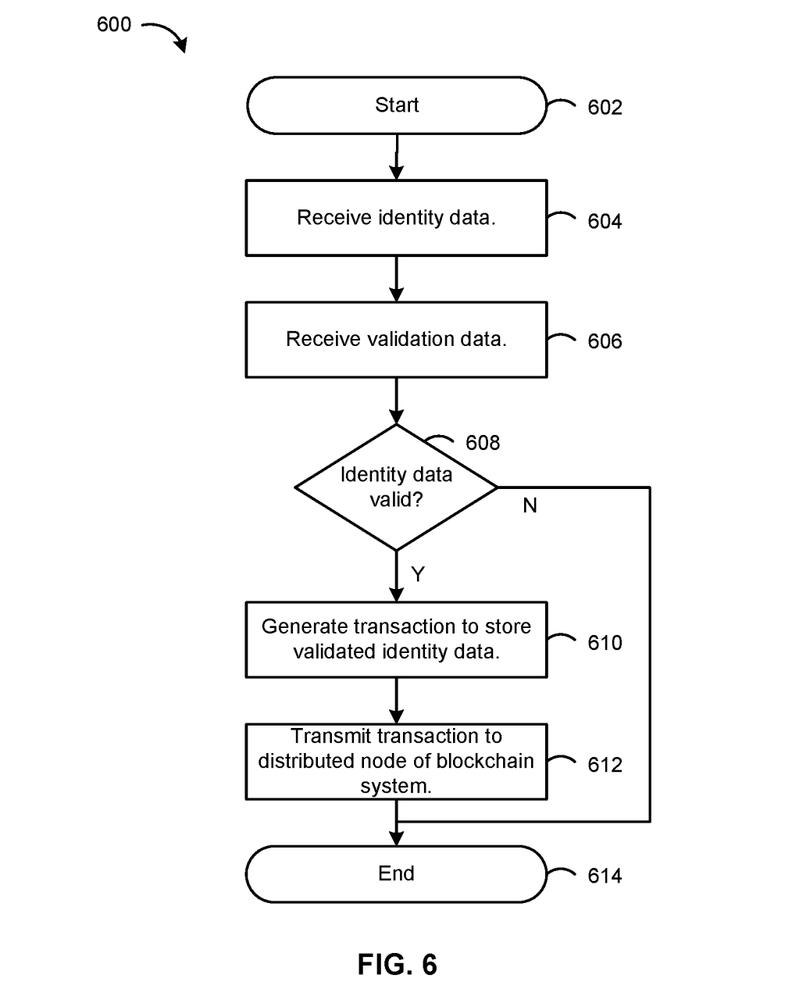
FIG. 6 is a flowchart depicting an embodiment of a method of providing a profile for an identity user on a blockchain of the blockchain system.
Figure 7:
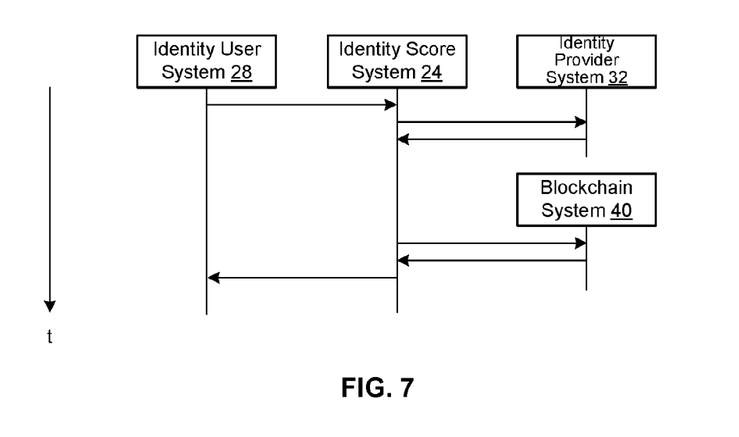
FIG. 7 is a flow diagram depicting an embodiment of data flows between system components over time for the method of FIG. 6.

FIG. 6 is a flowchart depicting an exemplary embodiment of a method 600 of providing a profile for an identity user, and FIG. 7 is a flow diagram showing data flows between system components over time for the exemplary embodiment.

The method begins at step 602. At step 604, the identity score system 24 receives identity data related to one or more identities from the identity user. The identity score system 24 receives the identity data from the identity user system 28 via the identity user system interface module 44, such as by a data transmission from the identity user system 28 to the identity score system 24 including the identity data.

The received identity data relates to one or more identities of the identity user. In embodiments, the identity user is an individual. In other embodiments, the identity user is another type of entity, such as a corporation, non-profit, or other organization.

The identities of the identity user may include one or more of: an identity issued by a government entity, such as a license, passport, other photo identity, social security card, certificate of incorporation, etc.; an identity issued by a commercial entity, such as a credit card, bank card, membership card, FICO score, Moody's rating, etc.; an identity issued by a social media company, such as an social media account issued by Facebook, Twitter, etc.; a biometric identity, such as fingerprints, facial characteristics, iris patterns, DNA sequences, etc.; or other types of identities.

The identity data may include an identifier identifying the identity. The identifier may be a number or alphanumeric string uniquely identifying the identity. For example, for an identity issued by a government entity, such as a license, passport, social security card or certification of incorporation, the identifier may be an identity number such as a license, passport, social security or incorporation number. For an identity issued by a commercial entity such as a credit card, bank card, or membership card, the identifier may be a card or account number such as a credit, bank or membership card or account number. For an identity issued by a social media company such as an social media account, the identifier may be a user name and/or a password for the account. For a biometric trait, the identifier may be an encoding of the trait, such as an encoding of a DNA sequence, fingerprint, iris pattern, facial configuration, etc.

The identity data also may include metadata describing the identity. The metadata may include one or more of: a type of the identity, such as identifying the identity as a license, passport, certificate of incorporation, credit card, bank card, social media account, biometric trait, etc.; an identification of an issuer of the identity, such as a government entity, company, or other entity; an validity date of the identity, such as an issue date and/or an expiration date of the identity; or a security feature or level of the identity, such as whether the identity includes a chip, or a rating of the security level, such as high, medium or low; etc.

At step 606, the identity score system 24 receives validation data indicating whether the received identity data is valid. To provide a reliable basis for identity services such as identity scoring, the identity score system 24 stores only data based on identity data that has been confirmed as being valid. In embodiments, the identity score system 24 receives the validation data for identity data identifying a particular identity from an identity provider that issued that identity. The identity score system 24 receives the validation data from the identity provider system 32 via the identity provider system interface module 48, such as by a data transmission from the identity provider system 32 to the identity system 24 including the validation data. In embodiments, the identity score system 24 may request the validation data from the identity provider system 32, such as by a data transmission from the identity score system 24 to the identity provider system 32 requesting the validation data for the received identity data, and the identity score system 24 may receive the validation data from the identity provider system 32 in response to such a request.

At step 608, it is determined whether the received identity data is valid based on the indication provided by the validation data. If the received identity data is valid, the method proceeds to step 610. If the received data is not valid, the method proceeds to step 614, where the method ends, aborting the addition of any data based on the received identity data to the user profile.

At step 610, a transaction to store a representation on the blockchain of one or more validated identities referenced in the received identity data is generated. As discussed above, the blockchain implements a distributed database in the form of a distributed transaction ledger, and includes an ordered sequence of data blocks, starting at a genesis block and growing by successively adding new blocks. Each block includes a header and a list of transactions that are incorporated into the block, where each transaction may modify an account or data of the blockchain. The transaction generated at step 610 includes an instruction to the blockchain system to store the data representing the one or more validated identities referenced in the received identity data in a block on the blockchain, and the data representing the one or more validated identities to be stored.

The data to be stored on the blockchain representing the one or more validated identities referenced in the received identity data may include one or more of: a representation of some or all of the received identity data, or a representation of some or all of the received validity data.

The data to be stored on the blockchain may include a representation of some or all of the received identity data. In embodiments, the data to be stored may include a cryptographically encoded version of some or all of the received identity data, such as a cryptographic hash of some or all of the identity data. For example, the data may include a cryptographic hash of one or more of: the identifier identifying the identity, or the metadata describing the identity (such as one or more of: the type of the identity, the issuer of the identity, the issue date of the identity, the expiration date of the identity, or the security feature or level of the identity).

The data to be stored on the blockchain also may include a representation of some or all of the received validation data. In embodiments, the data to be stored may include a cryptographically encoded version of some or all of the received validation data, such as a cryptographic hash of the indication that the received identity data is valid.

The data is stored on the blockchain in association with the identity user to whom it pertains. Thus, the data to be stored on the blockchain also may include a representation of an identifier identifying the identity user or a user profile of the identity user. In embodiments, the data to be stored may include a cryptographically encoded version of the indication of the identity user or user profile of the identity user.

At step 612, the generated transaction is transmitted to at least one of the distributed nodes 64 of the blockchain system 40. Distributed nodes 64 of the blockchain system 40 act to incorporate received transactions into blocks of the blockchain, also referred to as mining blocks of the blockchain, such as by performing cryptographic calculations of a selected difficulty. As part of this process, at least one distributed node 64 incorporates the transmitted transaction into a block of the blockchain, thereby executing the transaction to store the included data on the blockchain. The method 600 ends at step 614.

In embodiments, the method 600 of FIG. 6 may be performed repeatedly over time, as the identity user adds more identities to the identity profile.

In embodiments, a method of maintaining an identity profile for an identity user may include only any subset of, or an alternative ordering of, the features depicted in or discussed above in regard to FIG. 6.

Embodiments of the identity score system 24 also provide an identity score or score data service, based on the validated identity data stored on the blockchain, to an entity performing an identification of the individual. The identity score service may be tailored for different identification contexts, thereby increasing the usefulness of the score for a variety of different purposes.

Figure 8:
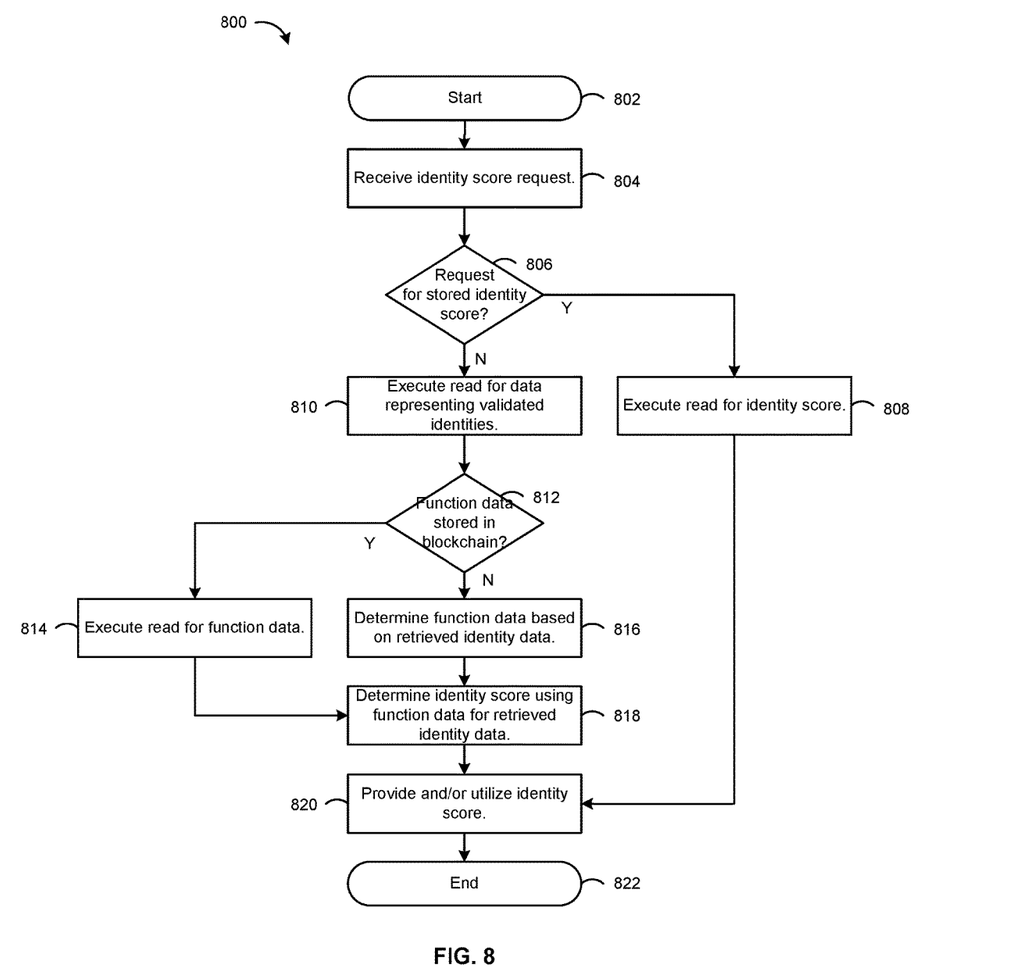
FIG. 8 is a flowchart depicting an embodiment of a method of providing an identity score based on data stored on the blockchain.
Figure 9:
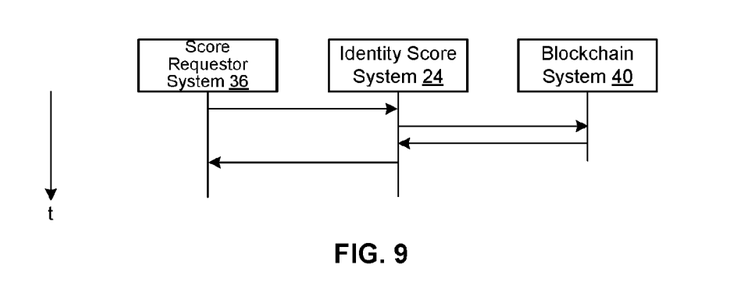
FIG. 9 is a flow diagram depicting an embodiment of data flows between system components over time for the method of FIG. 8.

FIG. 8 is a flowchart depicting an exemplary embodiment of a method 800 of providing an identity score, and FIG. 9 is a flow diagram showing data flows between system components over time for the exemplary embodiment.

The method begins at step 802. At step 804, the identity score system 24 receives an identity score request from an entity performing an identification of the identity user. The identity score system 24 receives the identity score request from the score requestor system 36 via the score requestor system interface module 52, such as by a data transmission from the score requestor system 36 to the identity score system 24 including the identity score request.

The received identity score request relates to an identity score for the identity user, which may be configured to quantify the identity of the identity user in different ways to accommodate different identification contexts. The identity score may be configured to provide an improved indication that the identity user is who is the identity user claims to be, one core purpose of an identification process. The identity score also may be configured to provide an indication of whether the identity user is suited to engage in a particular transaction or process being conducted by the entity submitting the identity score request. For example, the identity score may be configured to provide a quantification based on the relevance of the identity of the user to the user's suitability to engage in a commercial transaction, such as being conducted by a point of sale or other transaction device, such as to rent an apartment, car, or house, etc., buy a good, house, car, etc., receive credit, a loan, etc., or transfer a financial instrument, etc. In another example, the identity score may be configured to provide a quantification based on the relevance of the identity of the user to the outcome of a government process, such as being conducted by a government system, such as crossing a border, receiving a government service, etc. In another example, the identity score may be configured to provide a quantification based on the relevance of the identity of the user to the user's being authorized by a security device, such as a building or other security device granting or deny access to spaces.

The identity score is based on the data stored on the blockchain representing the validated identities of the identity user. The identity score is thus based on reliable, immutable, and secure data, as provided by the validation of the identity data and storage on the blockchain, and is thus itself a more reliable, immutable and secure process.

The identity score service may be flexibly configured, and thus the identity score request may take different forms. The identity score request may include a request by the identity score requestor for the identity score system 24 to provide an identity score for an identity user. The identity score request also may include a request by the identity score requestor for data from the identity score system 24 from which an identity score may be calculated, such as the data stored on the blockchain system 40 representing the validated identities. The identity score request also may include a request by the identity score requestor for function data to enable the calculation of the identity score, such as weight data indicating how different identities of the identity user should be weighted in calculating the identity score.

At step 806 it is determined whether the request is for an identity score of the identity user already stored on the blockchain. If the request is for an identity score stored on the blockchain, the method proceeds to step 808. At step 808, the blockchain is read to retrieve the identity score stored on the blockchain for the identity user. As discussed above, the distributed nodes 64 of the blockchain system 40 store blocks of the blockchain in the block storage module. The blockchain may be read by the identity score system accessing the blocks in the block storage module 68 of at least one distributed node 64 to review the blocks to determine transactions involving the identity user and retrieve identity score data stored in the blockchain for the identity user as a result. The blockchain is thus typically read without the need for generating and transmitting a transaction to read the blockchain system 40. Alternatively, in other embodiments, the blockchain may be read by generating and transmitting a transaction to the blockchain system 40 to read the blockchain.

If it is determined at step 806 that the request is instead for data from which the identity score may be calculated, the method proceeds to step 810. At step 810, the blockchain is read to retrieve the data stored on the blockchain for the identity user based on the validated identity data. The retrieved data may include one or more of: the representation of some or all of the received identity data, or the representation of some or all of the received validation data.

At step 812 it is determined whether function data at least partially defining the calculation of the identity score is stored on the blockchain. If it is determined that function data defining the calculation of the identity score is stored on the blockchain, the method proceeds to step 814. At step 814, the blockchain is read to retrieve the function data defining the calculation of the identity score. The blockchain may be read similarly to as discussed above in regard to step 808.

The identity score may be calculated based on the validated identities in different ways. The function data at least partially defines how the score is calculated. In one embodiment, the function data includes weight data determining a weight to be applied to each identity represented in the validated identity data, such as a respective weight for each identity. The weights determine the impact a given identity has in the score calculation. For example, relatively higher weight values may be assigned to identities of relatively greater importance to the score, and relatively lower weight values may be assigned to identities of relatively lesser importance to the score.

In an example embodiment, to calculate a score to provide an indication that the identity user is who is the identity user claims to be, relatively greater weights are assigned to identities relatively more relevant to this purpose, such as an identity issued by a government entity such as a license or a passport, and relatively lesser weights are assigned to identities relatively less relevant for this purpose, such as a social media account. In another example, to calculate a score to provide an indication that the identity user is qualified to conduct a proposed transaction with a score requestor, such as renting a car or receiving a loan, relatively greater weights are assigned to identities relatively more relevant to this purpose, such as a driver's license or a credit or bank card, and relatively lesser weights are assigned to identities relatively less relevant for this purpose, again such as a social media account.

If it is determined that function data for calculating the identity score is not stored on the blockchain, the method proceeds to step 816. At step 816, the function data is determined.

The function data may be determined in different ways. The function data may be determined based on at least part of the validated identity data. In embodiments, the function data may be based on the metadata of the identity data, such as one or more of: the type of the identity, the issuer of the identity, the validity date of the identity, or the security level or features of the identity.

For example, a relatively greater weight may be assigned to an identity issued by a government entity, such as a passport or license, than to bank or credit card or a social media account, depending upon the purpose of a particular identity score. A relatively greater weight may be assigned to an identity issued by a well respected or highly rated government entity than to a less well respected or lowly rated government entity. A relatively greater weight may be assigned to a currently valid identity than to an expired identity of the same type. A relatively greater weight may be assigned to an identity with security features, such as an embedded chip, than to an identity of the same type without security features The weights may be determined by different entities. In embodiments, the weights are determined by the identity score system 24 in response to the identity score request as part of the identity score service. Such embodiments provide a fast and easy identity score service to the identity score requestor. In embodiments, the weights are determined by identity score requestors. Such embodiments provide increased flexibility to the identity score requestor to determine the composition of the identity score according to particular identification contexts.

At step 818 the identity score is determined using the retrieved data for the individual and the function data. The identity score may be calculated in different ways according to the particular purpose and context of the score and according to the function data. In embodiments in which the function data includes weight data, the identity score is calculated by determining a contribution of each identity according to the corresponding weight.

Figure 10A:
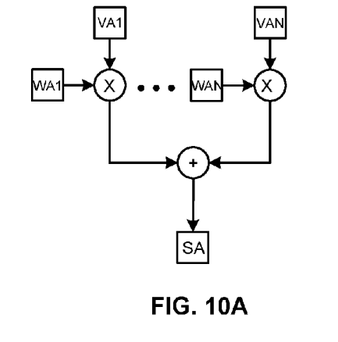
FIGS. 10A-10C are schematic diagrams depicting embodiments of logic circuits to calculate identity scores.

FIG. 10A is a schematic diagram depicting an embodiment of a logic circuit to perform a calculation of an identity score. The logic circuit includes, for each retrieved identity, a memory element VA1 . . . VAN to store an identity data or validation data value based on the retrieved data for that identity, such as a predetermined value for each different type of identity, a memory element WA1 . . . WAN to store a corresponding weight value from the function data, and a multiplication element X to multiply the identity validation value and the corresponding weight value. The logic circuit further includes a summing element+to then sum the multiplication results for each identity to form the identity score SA.

Figure 10B:
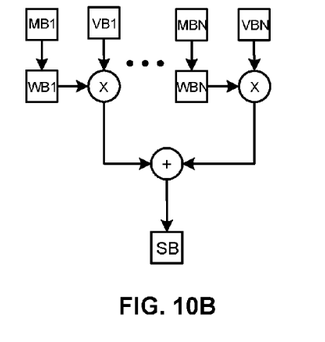

FIG. 10AB is a schematic diagram depicting an embodiment of a logic circuit to perform a determination of the function data and a calculation of an identity score. The logic circuit includes, for each retrieved identity: a memory element VB1 . . . VBN to store the identity data or validation data value based on the retrieved data for that identity; a memory element MB1 . . . MBN to store metadata from the retrieved identity data for that identity; a logic element WB1 . . . WBN to determine and store a corresponding weight value for that identity based on the retrieved metadata, such as by assigning a relatively higher weight to certain identity types and validity dates and a relatively lower weight to certain other identity types and validity dates, as discussed above; and a multiplication element X to multiply the identity data or validation data value and the corresponding weight value. The logic circuit further includes a summing element+to then sum the multiplication results for each identity to form the identity score.

Figure 10C:
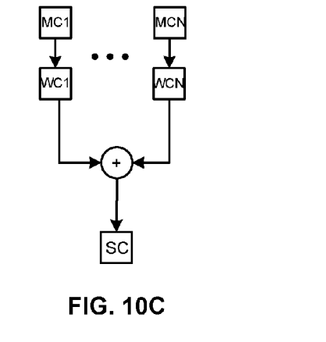

FIG. 10AC is a schematic diagram depicting an embodiment of a logic circuit to perform a determination of the function data and a calculation of an identity score. The logic circuit includes, for each retrieved identity, a memory element MC1 . . . MCN to store the metadata from the retrieved identity data for that identity, and a logic element WC1 . . . WCN to determine and store a corresponding weight value for that identity based on the retrieved metadata. The logic circuit further includes a summing element+to then sum the weights for each identity to form the identity score.

In other embodiments, the identity score may be composed using different combinations of multiplication and summation operations performed on one or more of the identity data, validation data, function data, etc.

The logic circuits of FIGS. 10A-10C may be implemented as hardware, software, or a combination thereof. In one example, the logic circuits may be implemented by memory elements and logic elements of a processor controlled according program instructions to implement the identity score composition.

Table 1 below tabulates an exemplary set of data for validated identities upon which an exemplary identity score calculation may be based. In the table, expired U.S. passports have medium security features and assigned a weight of 4, a current U.S. passport has high security features and is assigned a weight of 7, both expired and current Global Entry Program memberships have high security and are assigned a weight of 9, an expired state drivers license has basic security features and is assigned a weight of 2, a current state drivers license has basic security features and is assigned a weight of 3, a social security card has basic security features and is assigned a weight of 2, a FICO score has a basic security feature and is assigned a weight of 3, a currently active Twitter account has no or very low security features and is assigned a weight of 0.1, and a currently active LinkedIn account has no or very low security features and is assigned a weight of 0.2. An exemplary identity score may be calculated by summing these weights to give a score of 43.3.

TABLE 1

| Identity | Validity Date Range | Security Features | Weight |
|---|---|---|---|
| U.S. Passport | 1993-2003 | Medium | 4 |
| U.S. Passport | 2003-2013 | Medium | 4 |
| U.S. Passport | 2013-present | High | 7 |
| Global Entry Program | 2010-2015 | High | 9 |
| Global Entry Program | 2015-present | High | 9 |
| State Drivers License | 2005-2015 | Basic | 2 |
| State Drivers License | 2015-present | Basic | 3 |
| Social Security Number | Birth-present | Basic | 2 |
| FICO Score | 1986-present | Basic | 3 |
| Twitter Account | 2008-present | None | 0.1 |
| LinkedIn Account | 2006-present | None | 0.2 |

In embodiments, the identity score may be a numerical value. In embodiments, the identity score may be or include a categorization other than a numerical value, such as a categorization of a relative level, such as high, medium and low, or good, fair, and bad, etc.

The identity score may be determined by different entities. In embodiments, the identity score is determined by the identity score system 24 in response to the identity score request as part of the identity score service. As discussed above, such embodiments provide a fast and easy identity score service to the identity score requestor. In embodiments, the identity score is determined by identity score requestors using data retrieved for the individual. As discussed above, such embodiments provide increased flexibility to the identity score requestor to determine the composition of the identity score according to particular identification contexts.

At step 820, the determined identity score may be provided and/or utilized. In embodiments, the identity score may be provided to a system or device for utilization in an identification process. In embodiments in which the identity score is determined by the identity score system 24 in response to the identity score request, the identity score system 24 may provide the identity score to the score requestor system 36 via the score requestor system user interface module 52, such as by a data transmission from the identity score system 24 to the score requestor system 36 including the requested score. In embodiments in which the identity score is determined by the score requestor using data retrieved from the user profile, the identity score system 24 may have provided the retrieved data to the score requestor system 36 via the score requestor system user interface module 52, such as by a data transmission from the identity score system 24 to the score requestor system 36 including the retrieved data. In such cases, the identity score may be provided by the score requestor system 36 to another score requestor device or system for utilization. The method 800 ends at step 822.

In embodiments, the identity score may be utilized by a device or system conducting an identification process to at least partially control the operation of the device or system in an improved manner, such as by providing improved control the outcome of a transaction, security authorization or other process being conducted by the device or system. For example, the identity score provided to the score requestor system may be utilized by the score requestor system, such as a point of sale or other transaction terminal, to control the authorization of a transaction to purchase a good or service based on the identity score, which may provide an improved indication of, e.g., credit-worthiness, suitability for the purchased good or service, etc., thereby eliminating the need for additional system or devices to support the transaction terminal in such evaluations. In another example, the identity score provided to the score requestor system may be utilized by the score requestor system, such as a financial commodity trading device, to control the authorization of a transaction to transfer a financial commodity based on the identity score, which may provide an improved indication of, e.g., credit-worthiness, suitability for the transferred commodity, potential liability for the score requestor, etc., thereby eliminating the need for additional system or devices to support the trading device in such evaluations. In a further example, the identity score provided to the score requestor system may be utilized by the score requestor system, such as a building or other security authorization device, to control the authorization of entry of the identity user to a space or across a border based on the identity score, which may provide an improved indication of, e.g., suitability of the identity user for entry or crossing, etc., thereby eliminating the need for additional system or devices to support the security authorization device in such evaluations.

In embodiments, the method 800 of FIG. 8 may be performed repeatedly over time, as score requestors make further score requests.

In embodiments, a method of providing an identity score may include only any subset of, or an alternative ordering of, the features depicted in or discussed in regard to FIG. 8. For example, embodiments of a method of providing an identity score may be configured according to a known formulation, such as always retrieving function and/or score function data, or always determining function and/or score data, or some mixed combination thereof, and omit determinations and corresponding unused steps depicted in FIG. 8.

Embodiments of the identity score system 24 also may maintain function data and/or identity scores on the blockchain. Maintaining the function data and/or identity scores in the blockchain enables providing a fast and easy identity score service to the identity score requestor. Maintaining this data on the blockchain also creates an immutable history of the data over time, which may be beneficial in a variety of contexts, such as to provide a reliable record of the data to help remedy instances of identity theft or other malicious activity.

Figure 11:
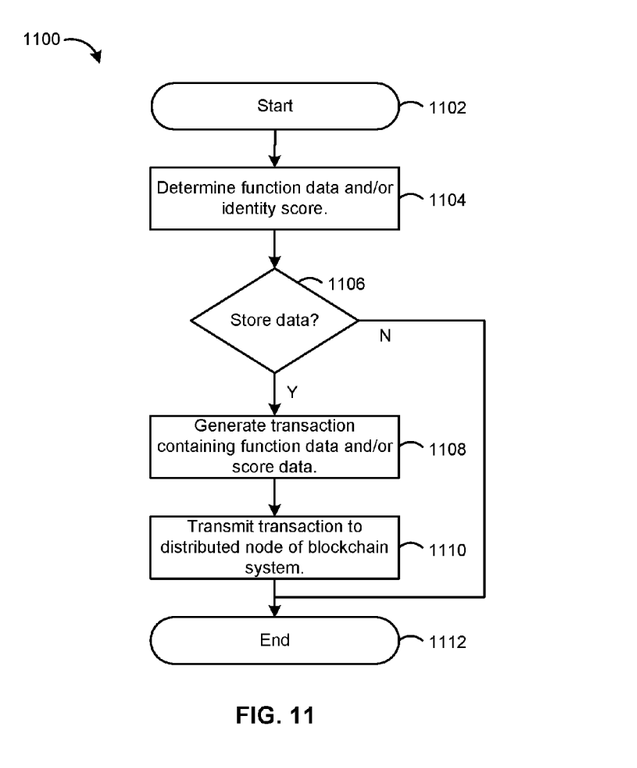
FIG. 11 is a flowchart depicting an embodiment of a method of maintaining function data and/or identity scores on the blockchain.

FIG. 11 is a flowchart depicting an exemplary embodiment of a method 1100 of maintaining function data and/or identity scores on the blockchain. The method begins at step 1102. At step 1104, the identity score system 24 determines one or more of the function data or identity scores. In embodiments in which the identity score system 24 determines the one or more of the function data or identity score, step 1104 is performed similarly to as discussed above in regard to the method 800 of FIG. 8. In embodiments in which the score requestor initially determines the one or more of the function data or identity score, the identity score system 24 may determine the function data or identity score from the score requestor system via the score requestor system interface module 52.

At step 1106, it is determined whether any portion of the determined function data and/or identity score is to be maintained on the blockchain. If at least a portion of the function data and/or identity score is to be maintained on the blockchain, the method proceeds to step 1108. If the function data and/or identity score are not to be maintained on the blockchain, the method proceeds to step 112. The identity score system 24 may determine whether at least a portion of the function data and/or identity score is maintained in a variety of ways. In embodiments, the identity score system 24 maintains such data on the blockchain as a default, and only not maintains the data on the blockchain in special circumstances. In embodiments, the identity score system 24 maintains such data on the blockchain depending upon an approach agreed upon between the identity score system provider and the identity user or score requestor. For example, the identity score system provider and the identity user or score requestor may agree that certain determined data is to be maintained on the blockchain.

At step 1108, a transaction is generated to store the identified data on the blockchain. The transaction may be configured to store the data in association with, e.g., the individual, a score requestor, etc. For example, the identity scores may be stored on the blockchain in association with the identity user profile for which they are calculated. The function data may be stored on the blockchain in association with a profile of a score requestor for whom the function data is used to determine the makeup of identity scores.

At step 1110, the transaction is transmitted to at least one of the distributed nodes 64 of the blockchain system 40. As part of a mining process, at least one distributed node 64 incorporates the transmitted transaction into a block of the blockchain, thereby executing the transaction to store the data on the blockchain. The method 1100 ends at step 1112.

In embodiments, the method 1100 of FIG. 11 may be performed repeatedly over time, as the function data or identity scores are generated.

In embodiments, a method of maintaining function data and/or identity scores on the blockchain may include only any subset of, or an alternative ordering of, the features depicted in or discussed in regard to FIG. 11.

In embodiments, a method of providing identity services may include any combination of the methods of FIGS. 6, 8 and 11, or any combination of any subset and/or alternative ordering of the features of such methods.

Figure 12:
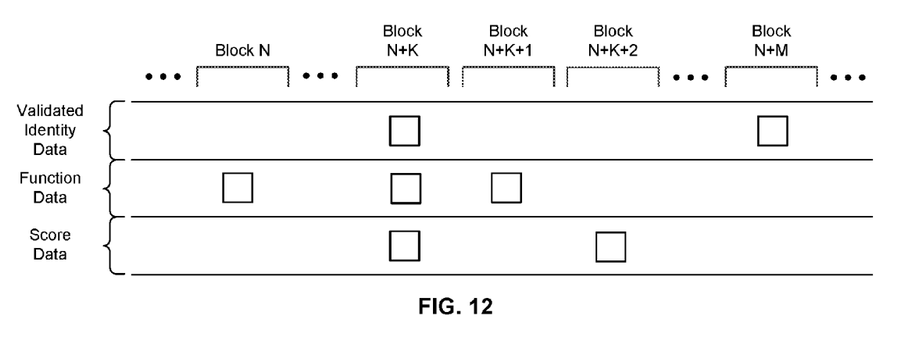
FIG. 12 is a schematic diagram depicting embodiments of storage of validated identity data, function data, and identity score data on the blockchain.

The validated identity data, function data, and score data may be stored on the blockchain over time in response to different triggers. FIG. 12 depicts embodiments of data storage in a portion of the blockchain. The blockchain includes an ordered sequence of blocks, from a block N, eventually to a block N+K, to a block N+K+1, to a block N+K+2, and eventually to a block N+M, etc. A top row depicts an exemplary embodiment of validated identity data stored in the blockchain in association with an individual as it is received from the identity user and validated, such as in block N+K, in which a set of data is stored related to one or more validated identities, and block N+M, in which another set of data is stored related to one or more validated identities. A second row depicts an exemplary embodiment of function data stored in the blockchain, such as in block N, e.g., at an initiation of a score requestor account, etc., in block N+K, e.g., upon being updated in response to new validated identity data, and in block N+K+1, e.g., upon being updated by the score requestor or as part of a regular update or aging of the function data. A third row depicts an exemplary embodiment of identity scores stored in the blockchain, such as in block N+K, e.g., upon the addition of new identity data, and in block N+K+2, e.g., as they are determined in response to identity score requests. In other embodiments, the validated identity data, function data, and identity scores may be stored differently, such as in different block, and/or in response to various other triggers.

Figures 13, 14:
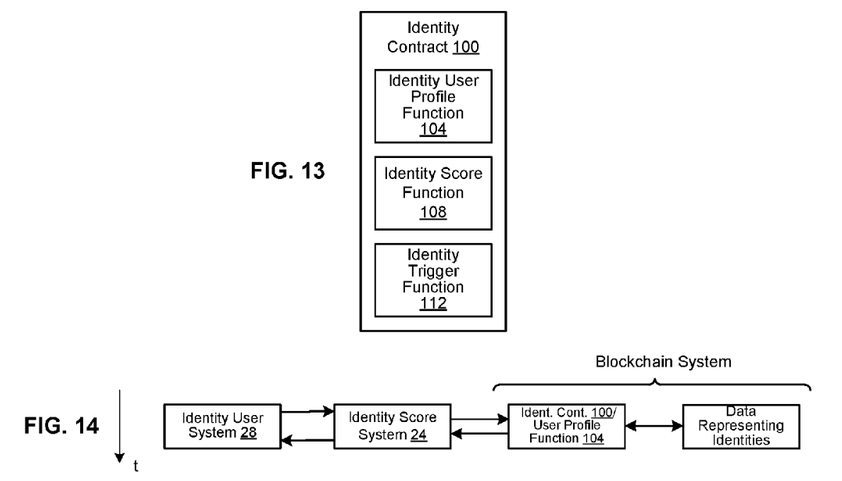
FIG. 13 is a schematic diagram depicting an embodiment of an identity contract.
FIG. 14 is a flow diagram depicting an embodiment of a call to an identity user profile function of the identity contract.

The identity score system 24 also may generate and propagate to the blockchain an identity contract to provide identity services. The identity contract is a smart contract including program instructions to be executed in response to transactions transmitted to the blockchain addressed to the identity contract. FIG. 13 depicts an exemplary embodiment of an identity contract 100 including an identity user profile function 104, an identity score function 108, and an identity trigger function 112. The identity user profile function 104 is a program function to store the validated identity data on the blockchain, such as discussed above in regard to FIG. 6. The identity score function 108 is a program function to retrieve the identity, function and score data, and/or determine or calculation such data, such as discussed above in regard to FIG. 8. The identity trigger function 112 is a program function to implement actions to be triggered in response to predefined events in the identity score system 24, such as a calculated identity score rising above (or below, as appropriate) a predefined threshold.

The functions of the identity contract 100 are triggered by the identity score system 24 addressing a transaction to the identity contract 100 including a call to the function to be triggered. FIG. 14 is a flow diagram depicting an exemplary embodiment of a call to the identity user profile function 104. The identity user system 28 provides identity data to the identity score system 24; the identity score system 24, upon validating the received identity data, generates and transmits a transaction addressed to the identity contract 100 to the blockchain system 40; and the identity contract 100 executes the user profile function 104 to store the representation of the validated identity data in the user profile on the blockchain.

Figure 15:
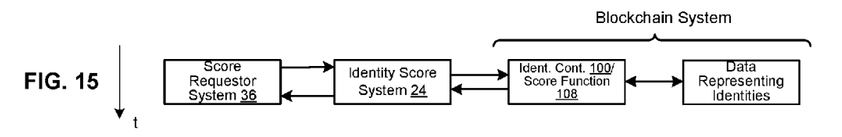
FIG. 15 is a flow diagram depicting an embodiment of a call to an identity score function of the identity contract.

FIG. 15 is a flow diagram depicting an exemplary embodiment of a call to the identity score function 108. The score requester system 32 provides a score request to the identity score system 24; the identity score system 24 generates and transmits a transaction addressed to the identity contract 100 to the blockchain system 40; and the identity contract 100 executes the identity score function 108 to preform one or more of the retrieval of validated identity data, determination or retrieval of function data, or determination or retrieval of identity scores.

Figure 16:
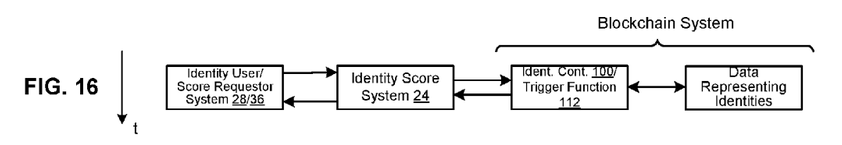
FIG. 16 is a flow diagram depicting an embodiment of a call to an identity trigger function of the identity contract.

FIG. 16 is a flow diagram depicting an exemplary embodiment of a call to the identity trigger function 112. The identity user or score requester system 28, 36 provides data or a request to the identity score system 24; the identity score system 24 generates and transmits a transaction addressed to the identity contract 100 to the blockchain system 40; and the identity contract 100 executes the trigger function 112 to perform a predetermined action in response to the data or request causing a predefined event, such as an identity score rising above (or below) a predetermined threshold. The predetermined action may include one or more of: communicating the occurrence of the predetermined event to a predetermined entity (such as the identity user, score requestor or governmental authority), setting a status of the user profile (such as enabling a temporary identity authorization in the case of identity theft), etc.

In embodiments, the identity contract 100 may include only any subset of the functions depicted in or discussed above in regard to FIG. 13.

In embodiments, the system for providing identity services 20 may include a different type of distributed transaction ledger system in place of the blockchain system 40, such as a distributed transaction ledger system having a data organization other than a blockchain, and embodiments of the methods 600, 800 and 1100 discussed herein may use such a distributed transaction ledger system in place of the blockchain system 40. Such a distributed transaction ledger system may have a distributed structure similar to as depicted in FIG. 3, including a plurality of distributed nodes that may be organized as a peer-to-peer network, at least one or some of which being connected to the identity score system. The distributed nodes of such a distributed transaction ledger system may include modules similar to as depicted in FIG. 4, such as a data storage module to store the data structures of the distributed transaction ledger system, a communication module, a virtual machine module, and a data creation module to create the data structures. The data storage module may include components similar to those depicted in FIG. 5, such as an identity data component, a function data component, an identity score component, and an identity contract component, to store corresponding data in the data structures of the distributed transaction ledger system.

Additional embodiments of the identity score system 24, identity user system 28, identity provider system 32, score requestor system 36, blockchain system 40 and associated methods of providing identity services to maintaining a user profile on the blockchain 600, provide identity scores 800, and maintain function data and identity scores on the blockchain 1100 discussed herein are possible. For example, any feature of any of the embodiments of these systems and methods described herein may be used in any other embodiment of these systems and methods. Also, embodiments of these systems and methods may include only any subset of the components or features of these systems and methods discussed herein.

What is claimed is:

1. A method of providing an identity score to verify an identity, the method comprising:
   receiving, by an identity system at an interface to a user system, identity data from the user system, the identity data related to a plurality of identities of an identity user;
   receiving, by the identity system at one or more interfaces to one or more identity provider systems, validation data from the one or more identity provider systems, the validation data related to the identity data;
   upon the validation data indicating that the identity data is valid, generating one or more transactions to store data related to each of the plurality of identities of the identity user on a blockchain of a blockchain system, the data to be stored including for each of the plurality of identities a representation of at least one of: the identity data, or the validation data;
   transmitting the one or more transactions to at least one distributed node of the blockchain system;
   executing a read to the blockchain system to retrieve the data related to the plurality of identities;
   determining the identity score as a combination of, for each of the plurality of identities, a respective quantity based on the retrieved data; and
   providing, by the identity system at an interface to a score requestor system, the identity score to the score requestor system.

2. The method of claim 1, wherein the identity data includes an identifier identifying the identity.

3. The method of claim 1, wherein the identity data includes metadata describing the identity, the metadata including at least one of: a type of the identity, a validity date range of the identity, a security feature of the identity.

4. The method of claim 1, wherein the identity is issued by the identity provider.

5. The method of claim 1, wherein the identity includes at least one of: a government-issued identity, a bank account, a credit account, a social media account, or a biometric trait.

6. The method of claim 1, wherein the identity user is an individual.

7. The method of claim 1, wherein the identity user is an organization.

8. The method of claim 1, further comprising requesting the validation data from the identity provider in response to receiving the identity data.

9. The method of claim 1, wherein the receiving the identity data, receiving the validation data, generating the transaction, and transmitting the transaction are performed repeatedly over time to store data on the blockchain related to a plurality of different identities of the identity user.

10. The method of claim 1, further comprising cryptographically encoding the at least one of the identity data or validation data to generate the representation of the at least one of the identity data or validation data.

11. The method of claim 1, further comprising:
   receiving an identity score request for the identity user from the identity score requestor.

12. The method of claim 11, wherein the identity score request is received from the score requestor system as part of an identification being conducted by the score requestor system on the identity user.

13. The method of claim 12, wherein the score requestor system includes at least one of: a point of sale device, a biometric scanning device, or a security authorization device.

14. The method of claim 11, further comprising using, by a device, the identity score to authorize or deny at least one of: a financial transaction, or entry to a space.

15. A method of providing an identity score to verify an identity, the method comprising:
   for each of a plurality of identities of an identity user, storing data related to validated identity data of the respective identity in a blockchain of a blockchain system;
   receiving, by an identity system at an interface with a score requestor system, an identity score request from the score requestor system;
   executing a read to at least one distributed node of the blockchain system to retrieve the data related to the plurality of identities of the identity user stored on the blockchain of the blockchain system;
   for each of the plurality of identities, determining a weight;
   determining the identity score as a function of the weights for each of identities; and
   providing, by the identity system at the interface with the score requestor system, the determined identity score to the score requestor system.

16. The method of claim 15, wherein the identity score is determined as a sum of the weights of the identities.

17. The method of claim 15, wherein the identity score is determined as a sum of factors based on the weights of the identities.

18. The method of claim 15, wherein for each of the one or more identities, the weight is determined as a function of the retrieved data related to that identity.

19. The method of claim 15, wherein the retrieved data includes at least one of: a type of the identity, a validity data range of the identity, or a security feature of the identity.

20. The method of claim 15, wherein the executing the read, determining the weight, and determining the identity score are performed by the identity system.

21. The method of claim 15, wherein the score requestor system performs at least one of: the determining the weight, or the determining the identity score.

22. The method of claim 15, wherein the identity score request is received from the score requestor system as part of an identification being conducted by the score requestor system on the identity user.

23. The method of claim 22, wherein the identification is a governmental identification of the individual during at least one of: a border crossing, or a law enforcement detainment.

24. The method of claim 22, wherein the identification is a commercial identification of the individual during a financial transaction involving the identity user.

25. The method of claim 22, wherein the score requestor system includes at least one of: a point of sale device, a biometric scanning device, or a security authorization device.

26. The method of claim 22, further comprising using, by the score requestor system, the identity score to authorize or deny at least one of: a financial transaction, or entry to a space.

27. The method of claim 15, further comprising:
receiving identity data from the identity user, the identity data related to the one or more identities of the identity user; and
receiving validation data from an identity provider, the validation data related to the identity data.

28. A non-transitory machine-readable storage medium having program instructions, which when executed by a processor perform a method of providing an identity score to verify an identity, the method comprising:
receiving, by an identity system at an interface to a user system, identity data from the user system, the identity data related to a plurality of identities of an identity user;
receiving, by the identity system at one or more interfaces to one or more identity provider systems, validation data from the one or more identity provider systems, the validation data related to the identity data;
upon the validation data indicating that the identity data is valid, generating one or more transactions to store data related to each of the plurality of identities of the identity user on a blockchain of a blockchain system, the data to be stored including for each of the plurality of identities a representation of at least one of: the identity data, or the validation data;
transmitting the one or more transactions to at least one distributed node of the blockchain system;
executing a read to the blockchain system to retrieve the data related to the plurality of identities;
determining the identity score as a combination of, for each of the plurality of identities, a respective quantity based on the retrieved data; and
providing, by the identity system at an interface to a score requestor system, the identity score to the score requestor system.

29. A non-transitory machine-readable storage medium having program instructions, which when executed by a processor perform a method of providing an identity score to verify an identity, the method comprising:
for each of a plurality of identities of an identity user, storing data related to validated identity data of the respective identity in a blockchain of a blockchain system;
receiving, by an identity system at an interface with a score requestor system, an identity score request from the score requestor system;
executing a read to at least one distributed node of the blockchain system to retrieve the data related to the plurality of identities of the identity user stored on the blockchain of the blockchain system;
for each of the plurality of identities, determining a weight;
determining the identity score as a function of the weights for each of identities; and
providing, by the identity system at the interface with the score requestor system, the determined identity score to the score requestor system.

30. A system for providing identity services, the system comprising:
a processor; and
a non-transitory machine-readable storage medium having program instructions, which when executed by the processor perform a method of providing an identity score to verify an identity, the method comprising:
receiving, by an identity system at an interface to a user system, identity data from the user system, the identity data related to a plurality of identities of an identity user;
receiving, by the identity system at one or more interfaces to one or more identity provider systems, validation data from the one or more identity provider systems, the validation data related to the identity data;
upon the validation data indicating that the identity data is valid, generating one or more transactions to store data related to each of the plurality of identities of the identity user on a blockchain of a blockchain system, the data to be stored including for each of the plurality of identities a representation of at least one of: the identity data, or the validation data;
transmitting the one or more transactions to at least one distributed node of the blockchain system;
executing a read to the blockchain system to retrieve the data related to the plurality of identities;
determining the identity score as a combination of, for each of the plurality of identities, a respective quantity based on the retrieved data; and
providing, by the identity system at an interface to a score requestor system, the identity score to the score requestor system.

31. The system of claim 30, the method further comprising:
receiving an identity score request for the identity user from the identity score requestor.

* * * * *